J. M. CLARK.
MEANS FOR CONTROLLING DANGEROUS GASES IN SUBMARINES AND OTHER CRAFT.
APPLICATION FILED MAR. 10, 1916.
1,198,419.
Patented Sept. 19, 1916.
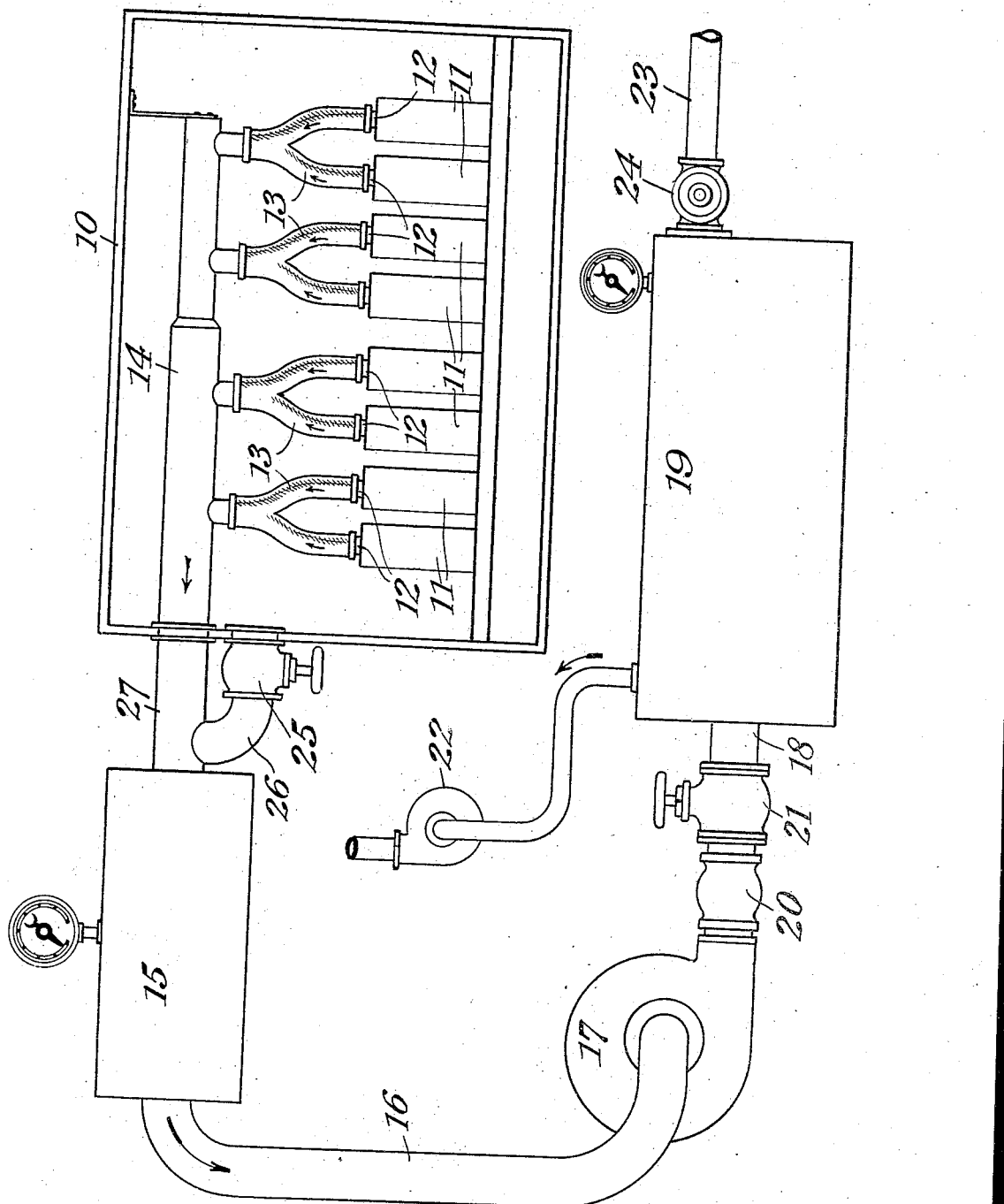
Inventor,
John M. Clark,
By his Attorney
A. R. Appleman

UNITED STATES PATENT OFFICE.

JOHN M. CLARK, OF WHITESTONE, NEW YORK.

MEANS FOR CONTROLLING DANGEROUS GASES IN SUBMARINES AND OTHER CRAFT.

1,198,419. Specification of Letters Patent. Patented Sept. 19, 1916.

Application filed March 10, 1916. Serial No. 83,443.

*To all whom it may concern:*

Be it known that I, JOHN M. CLARK, a citizen of the United States, residing at Whitestone, Queens county, New York, have invented a new and useful Improvement in Means for Controlling Dangerous Gases in Submarines and other Craft, of which the following is a specification.

My invention relates to means for controlling dangerous gases in submarines and other craft, a principal object being to provide suitable apparatus to effectively harness or confine such gases emanating from the lead and alkali battery cells now in general use in submarine power equipment, which under present conditions, are allowed to escape and mingle with the air of the battery room and other compartments, resulting at times in internal explosions and also militate against long submergence, in that the breathing air becomes so vitiated as to seriously affect the operating crew, and it is the object of my invention to prevent these internal explosions and to keep the air in the various compartments of a submarine or other craft free from all noxious, dangerous and harmful gases.

The invention contemplates means for confining the above described gases and conveying them to a suitable storage receptacle while the submarine is submerged, from which receptacle the said gases may be drawn or expelled for use as engine fuel or be allowed to escape outboard when the craft is at the surface.

The drawing shows diagrammatically one arrangement of apparatus whereby the desired result may be obtained to carry out my invention, and in which the battery room of a submarine or other craft is designated by the numeral 10, the battery cells are shown at 11, which are provided with the usual gas checks 12, having gas tight connection with flexible tubes 13, communicating with a manifold 14, leading out of the battery room into a gas reservoir 15, connected by pipe 16, to a rotary or other pump 17, whose outlet communicates by pipe 18, with a gas storage tank 19, said pipe 18, being provided with a check valve 20, and a stop valve 21.

An exhaust pump 22, is connected with the storage tank 19, to remove all air therefrom before the hydrogen or other dangerous gases are allowed to enter.

An outlet connection, as at 23, is provided to convey the stored gas either to the explosion chamber of an internal combustion engine as fuel or the stored gas may be expelled outboard into the air through a suitable outlet when the submarine is at the water surface.

I also provide a valve 25, positioned in a branch pipe 26, connecting the battery room 10, with the manifold extension 27, through which valve, chlorin or other gases generated or confined in the said battery room may be drawn or delivered to the manifold extension and conveyed, together with the gases emanating from the battery cells, along to the gas storage tank 19, by the action of the pump 17, as will be readily understood.

From the foregoing description, it will be seen a direct pipe line is established between the gas outlets of the battery cells 11, and the gas storage tank 19, through which the dangerous, noxious gases generated in the said cells is conveyed through the instrumentality of the pump 17, thereby eliminating any possibility of contaminating or otherwise affecting the breathing air of the battery room or other compartment of the submarine or other craft.

In the operation of the apparatus a partial vacuum is constantly maintained in the manifold 14, reservoir 15, and pipe 16, which reservoir 15, serves to arrest pump pulsations, so that they do not reach the battery cells.

What I claim is:—

1. In an apparatus of the class described, in combination with the usual battery cells, a manifold having flexible piped connections with the cells and being extended through the battery room wall, a reservoir connected with the manifold, a valved branch pipe connecting the manifold with the interior of the battery room, to convey injurious gases therefrom, a storage tank having an air exhausting pump connected therewith, and having piped connection with the reservoir, and another pump in the last named connection adapted to maintain a partial vacuum in the manifold for the purpose specified.

2. In an apparatus of the class described, a manifold having piped connections with the usual battery cells, a branch pipe in said manifold having a valve and communicating with the interior of the battery room to convey dangerous gases therefrom, a storage tank, a pump connected to the manifold to maintain a partial vacuum therein, and a reservoir placed between the pump and manifold to prevent the pump pulsations from reaching the battery cells as described.

In testimony whereof, I JOHN M. CLARK have signed my name to this specification, this 6th day of March, 1916.

JOHN M. CLARK.

Copies of this patent may be obtained for five cents each, by addressing the "Commissioner of Patents, Washington, D. C."